(12) United States Patent
Ma et al.

(10) Patent No.: US 11,845,126 B2
(45) Date of Patent: Dec. 19, 2023

(54) METAL ADDITIVE MANUFACTURING EXTRUSION MECHANISM FOR MONITORING AND IMPROVING MECHANICAL PROPERTIES IN SITU

(71) Applicant: Jilin University, Changchun (CN)

(72) Inventors: Zhichao Ma, Changchun (CN); Shuai Tong, Changchun (CN); Dongni Liu, Changchun (CN); Weizhi Li, Changchun (CN); Shengteng Zhao, Changchun (CN); Guolin Xiao, Changchun (CN); Hairui Du, Changchun (CN)

(73) Assignee: JILIN UNIVERSITY, Jilin (CN)

( * ) Notice: Subject to any disclaimer, the term of this patent is extended or adjusted under 35 U.S.C. 154(b) by 352 days.

(21) Appl. No.: 17/136,927

(22) Filed: Dec. 29, 2020

(65) Prior Publication Data

US 2021/0197255 A1 Jul. 1, 2021

(51) Int. Cl.
| | |
|---|---|
| *B22D 46/00* | (2006.01) |
| *B33Y 30/00* | (2015.01) |
| *B33Y 50/02* | (2015.01) |
| *G01B 11/24* | (2006.01) |
| *G01B 11/30* | (2006.01) |
| *G01K 7/02* | (2021.01) |

(Continued)

(52) U.S. Cl.
CPC .......... *B22D 46/00* (2013.01); *B22D 23/003* (2013.01); *B33Y 30/00* (2014.12); *B33Y 50/02* (2014.12); *G01B 11/24* (2013.01); *G01B 11/303* (2013.01); *G01K 7/02* (2013.01); *G01N 21/4788* (2013.01)

(58) Field of Classification Search
CPC ...... B22D 46/00; B22D 23/003; B22D 39/06; B33Y 30/00; B33Y 50/02; B33Y 40/00; G01B 11/24; G01B 11/303; G01B 21/32; G01K 7/02; G01K 1/14; G01N 21/4788; B22F 2999/00; B22F 10/22; B22F 12/53; B22F 12/90; Y02P 10/25
See application file for complete search history.

(56) References Cited

U.S. PATENT DOCUMENTS 10,254,499 B1 * 4/2019 Cohen .................... H01R 4/024

\* cited by examiner

*Primary Examiner* — John A Hevey
(74) *Attorney, Agent, or Firm* — MILLEN, WHITE, ZELANO & BRANIGAN, P.C.; William Nixon; Wan-Ching Montfort

(57) ABSTRACT

The present disclosure relates to a metal additive manufacturing extrusion mechanism for monitoring and improving mechanical properties in situ, and belongs to the technical field of metal additive manufacturing. The mechanism comprises a wire conveying unit, a composite cavity unit, a high-temperature loading unit, a temperature detecting unit, a pressure loading unit, a pressure detecting unit and an in-situ monitoring unit. Multi-stage high-temperature loading is achieved through silicon nitride heater components distributed in the piston, the outer wall of the cavity and the nozzle, and meanwhile service temperature detection is achieved through thermocouple components. Multi-stage pressurization is achieved through continuous pressure loading of the wire conveying mechanism and high-frequency pressure loading of the piston mechanism and the four-rod mechanism, and then service pressure detection is achieved through strain gauge components on the top of the piston and the inner wall of the cavity.

6 Claims, 3 Drawing Sheets

(51) Int. Cl.
*G01N 21/47* (2006.01)
*B22D 23/00* (2006.01)

METAL ADDITIVE MANUFACTURING EXTRUSION MECHANISM FOR MONITORING AND IMPROVING MECHANICAL PROPERTIES IN SITU

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TRADEMARK STATEMENT

Trademarks used in the disclosure of the invention and the applicants make no claim to any trademarks referenced.

CROSS-REFERENCE TO RELATED APPLICATION

This application claims priority from Chinese Patent Application No. CN 201911404695.9, filed Dec. 31, 2019, titled METAL ADDITIVE MANUFACTURING EXTRUSION MECHANISM FOR MONITORING AND IMPROVING MECHANICAL PROPERTIES IN SITU which is hereby incorporated by reference herein for all purposes.

BACKGROUND OF THE INVENTION

1) Field of the Invention

The present disclosure relates to the field of instruments and meters, in particular to an in-situ testing system for micro-mechanical properties of materials, in particular to a metal additive manufacturing extrusion mechanism for monitoring and improving mechanical properties in situ which integrates high-resolution optical imaging and synchronous radiation analysis functions. The system can carry out high-temperature loading and pressure loading on materials in the cavity of the metal additive manufacturing extrusion mechanism to improve the mechanical properties of metal products, and meanwhile, the system can detect the temperature and pressure of materials. Through simultaneous characterization of optical imaging and synchronous radiation analysis, the correlation between the evolution behavior of the material microstructure and the temperature and pressure parameters can be established, so as to provide reliable equipment for in-depth understanding of the control of mechanical properties and physical field parameters of metal materials.

2) Description of Related Art

Three dimensional (3D) printing, also known as Additive Manufacturing (AM) technology, is a rapid prototyping technology. With the help of digital manufacturing devices similar to printers, the digital model is layered and the required solid model is formed by continuous superposition of materials. Under the background of "Made in China 2025", facing the fierce market competition environment, how to improve its own strength and stand on the top of "intelligent manufacturing" in the world has become one of the hot topics in the current 3D printing industry. 3D printing has developed slowly in the past 20 years in China, and there are three technical bottlenecks: (1) the types and properties of materials are limited, and especially there are still many problems in the field of manufacturing with metal materials; (2) the efficiency of manufacturing and prototyping needs to be further improved; (3) it is urgent to improve the size, precision and stability of the process.

Therefore, there is a need to improve three dimensional printing by removing the bottle necks.

BRIEF SUMMARY OF THE INVENTION

Manufacturing has made significant advancements in quality control with the wide integration and expanded application of scanning electron microscopic imaging technology, X-ray crystal diffraction technology, synchronous radiation characterization technology and optical microscopic imaging technology in the field of material micromechanical properties testing, the in-situ mechanical testing technology based on synchronous monitoring of multiple characterization means all of which play an increasingly prominent role in the study of the micromechanical behavior and deformation damage mechanism of structural and functional materials. For example, the simultaneous characterization of optical microscopic imaging technology and microscopic CT technology can intuitively obtain the surface topography and internal three-dimensional micro-structure of materials.

To sum up, the metal additive manufacturing extrusion mechanism, which can be integrated into the in-situ test of micro-mechanical properties of materials, needs to expand its general integration with various characterization and observation technologies. Realizing the dual synchronous characterization of surface topography and internal structure of materials in the composite cavity under the action of multiple physical fields is conducive to the accurate evaluation of the evolution of microstructure and failure mechanism of materials. In combination with the urgent need to improve the mechanical properties of metal materials in additive manufacturing finished products, it is necessary to develop a metal additive manufacturing extrusion mechanism which integrates optical microscopic imaging and synchronous radiation characterization for simultaneous monitoring of the surface topography/three-dimensional structure.

The object of the present disclosure is to provide a metal additive manufacturing extrusion mechanism for monitoring and improving mechanical properties in situ, which solves the current situation that the mechanical properties of metal additive manufacturing finished products need to be improved urgently. The mechanism has an in-situ monitoring function in the manufacturing process of metal components, realizes real-time characterization of grain nucleation process, integrates a pressure control unit and a temperature control unit by adjusting multiple physical field parameters, and realizes molding regulation of material strength in combination with a detection control unit and a corresponding servo control strategy. By integrating the optical microscopic imaging function and the synchronous radiation characterization function, and relying on the metal additive manufacturing extrusion mechanism realized by the present disclosure, an in-situ mechanical test for synchronously monitoring the surface topography and the internal three-dimensional structure of the measured semi-solid metal can be constructed. At the same time, by integrating three groups of ceramic heaters and thermocouples on the outer wall of the cavity, three groups of strain gauges are integrated on the inner wall of the cavity, and micro thermocouples, micro ceramic heaters and micro strain gauges are integrated inside the crank rocker mechanism and its piston, so that the mechanical properties of metal materials in the cavity under the action of multiple physical fields can be improved. The length, width and height of the mechanical main unit of the present disclosure are 36 mm (1.41 inches), 23 mm (0.90 inches) and 44 mm (1.73 inches) respectively.

The above object of the present disclosure is achieved by the following technical scheme:

A metal additive manufacturing extrusion mechanism for monitoring and improving mechanical properties in situ, comprising a wire conveying unit, a composite cavity unit, a high-temperature loading unit, a temperature detecting unit, a pressure loading unit, a pressure detecting unit and an in-situ monitoring unit, wherein the composite cavity unit is rigidly connected with a piston 4 of the pressure loading unit and a heating body 6 of the high-temperature loading unit through its cavity 5, a strain gauge 22 and a nozzle 8, respectively; a ceramic heater 7 in the high-temperature loading unit and a micro ceramic heater 24 are embedded and installed inside the heating body 6 and the piston 4, respectively; a thermocouple 13 in the temperature detecting unit and a micro thermocouple 21 are embedded and installed inside the heating body 6 and the piston 4, respectively; the wire 1 in the pressure loading unit is in interference fit with the inner wall of the piston 4 to form the first-stage pressure loading; the piston 4, a rocker 15 and a crank 17 are connected through a first hinge 14 and a second hinge 16, respectively; a strain gauge 22 in the pressure detecting unit and a micro strain gauge 23 are embedded and installed on the inner wall of the cavity 5 and the top end of the piston 4, respectively; and a substrate 9 is provided with a three-degrees-of-freedom movement control system, which moves relative to the metal additive manufacturing extrusion mechanism.

The wire conveying unit comprises a wire 1, a first driving motor 2, a first feeding roller 3 and a second feeding roller 20, wherein the first driving motor 2 provides power for a servo motor; the external surfaces of the first feeding roller 3 and the second feeding roller 20 have texture structures, and the side surface of the second feeding roller 20 is provided with a spring mechanism;

The composite cavity unit comprises a cavity 5, a heating body 6, a strain gauge 22 and a nozzle 8, wherein the upper end of the inner wall of the cavity 5 is provided with an annular groove structure, which is capable of being closely attached with the piston 4 in the pressure loading unit through an annular sealing gasket to realize sealing protection at the high-temperature loading unit and the pressure loading unit;

The high-temperature loading unit comprises a ceramic heater 7 and a micro ceramic heater 24, wherein the micro ceramic heater 24 is in interference fit with the hole wall of the piston 4 in the pressure loading unit, the ceramic heater 7 is in interference fit with the pores outside the heating body 6, and three groups of ceramic heaters 7 are distributed uniformly in a surrounding manner;

The temperature detecting unit comprises a thermocouple 13 and a micro thermocouple 21, wherein the micro thermocouple 21 is in interference fit with the hole wall of the piston 4 in the pressure loading unit, the thermocouple 13 is in interference fit with the pores outside the heating body 6, and three groups of thermocouples 13 are distributed uniformly in a surrounding manner;

The pressure loading unit comprises a piston 4, a rocker 15, a crank 17, a first hinge 14, a second hinge 16, a second driving motor 18, a wire 1, a first feeding roller 3 and a first driving motor 2, wherein the upper end of the inner wall of the cavity 5 is provided with an annular groove structure, which is capable of being closely attached with the piston 4 in the pressure loading unit through an annular sealing gasket to realize sealing protection at the pressure loading unit; the inner wall of the piston 4 is also provided with an annular groove structure, which is capable of being closely attached with the wire 1 in the pressure loading unit through an annular sealing gasket to realize sealing protection at the pressure loading unit and prevent gas from entering the cavity 5 in the composite cavity unit;

The pressure detecting unit comprises a strain gauge 22 and a micro strain gauge 23, wherein the micro strain gauge 23 is in interference fit with the pores at the top end of the piston 4 in the pressure loading unit, the strain gauge 22 is in interference fit with the pores at the inner wall of the cavity 5, and three groups of strain gauges 22 are distributed uniformly in a surrounding manner;

The in-situ monitoring unit comprises an in-situ imaging instrument 12, a nozzle 8, a quartz observation window 10 and an optical imaging component, wherein the nozzle 8 is made of a thin-walled aluminum plate and is internally shunted, the optical imaging component monitors the surface texture and topography of the measured semi-solid metal in real time through the quartz observation window 10, and the in-situ imaging instrument 12 analyzes the crystal diffraction information and three-dimensional structural characteristics of the measured semi-solid metal by receiving a synchronous radiation light source 11 transmitted through the thin-walled aluminum plate of the nozzle 8.

Three groups of ceramic heaters 7 and thermocouples 13 in the high-temperature loading unit and the temperature detecting unit are uniformly distributed in a surrounding manner to form a second-stage high-temperature loading; the wire 1 is uniformly and fully heated in the cavity 5 due to the uniform distribution in a surrounding manner; and the micro ceramic heater 24 and the micro thermocouple 21 embedded in the piston 4 form the first-stage heating, which plays a preheating role in the process of the wire 1 passing through the piston 4.

The in-situ monitoring unit is capable of simultaneously characterizing the synchronous radiation of the optical surface topography and three-dimensional characteristic structure of the measured semi-solid metal; the optical imaging component observes the optical surface topography of semi-solid metal in real time through the quartz observation window 10 embedded in the side of the nozzle 8, the front objective lens of the optical imaging component has the function of continuously zooming, so that the sunken optical imaging design is used to monitor the topography of the measured semi-solid metal; meanwhile, a thin-walled aluminum plate with a radius of 100 microns (0.00393701 inches) and a thickness of 100 microns (0.00393701 inches) is provided at the center of the nozzle 8, and the synchronous radiation light source is capable of penetrating the center of the thin-walled aluminum plate to the in-situ imaging instrument 12, thereby performing crystal diffraction characterization on the measured semi-solid metal.

The wire 1 in the pressure loading unit and the pressure detecting unit relies on the power of the wire conveying unit consisting of the first driving motor 2, the first feeding roller 3 and the second feeding roller 20 to provide the first-stage pressure loading, and the crank rocker mechanism consisting of the piston 4, the rocker 15, the crank 17, a first hinge 14, a second hinge 16 and a second driving motor 18 provides the second-stage pressure loading, wherein the second driving motor 18 is a servo motor, which cooperates with the four-rod mechanism to provide high-frequency, high-precision and high-stability closed-loop control pressure for the composite cavity unit; the micro strain gauge 23 is embedded in the top of the piston 4, and three groups of strain gauges 22 are uniformly embedded in the inner wall of the cavity 5 in a surrounding manner, thus providing omnibearing pressure detection for a molten pool system and forming real-time feedback.

The cavity 5 and the heating body 6 are made of copper materials; the control wires of the first driving motor 2, the ceramic heater 7, the thermocouple 13, the second driving motor 18, the micro ceramic heater 24 and the micro thermocouple 21 are all connected to a numerical control system 19 for integrated control.

The present disclosure has the advantages that the structure is compact, and the main body sizes are 36 mm (1.41 inches), 23 mm (0.90 inches) and 44 mm (1.73 inches). Compared with the prior art, the present disclosure can realize uniform high-temperature multi-stage loading of semi-solid metal, and multi-stage loading of constant pressure and high-frequency pressure, aiming at realizing shape control and property control of metal additive manufacturing finished products through regulation and control of multiple physical field parameters. Meanwhile, the present disclosure integrates optical imaging technology, synchronous radiation characterization technology, temperature detection technology and pressure detection technology into the metal additive manufacturing extrusion mechanism, which can realize synchronous high-resolution characterization of the surface topography and the internal three-dimensional structure of the measured semi-solid metal and obtain real-time cavity temperature parameters and pressure parameters, thereby forming real-time and effective feedback to act on high-temperature loading and pressure loading, and obtaining metal additive manufacturing finished products with high mechanical properties.

BRIEF DESCRIPTION OF THE DRAWINGS

The drawings described here are used to provide a further understanding of the present disclosure and constitute a part of the present disclosure. The illustrative examples of the present disclosure and their descriptions are used to explain the present disclosure, rather than constitute an improper limitation of the present disclosure.

In the figures: 1. Wire; 2. First driving motor; 3. First feeding roller 1; FIG. 4. Piston; 5. Cavity; 6. Heating body; 7. Ceramic heater; 8. Nozzle; 9. Substrate; 10. Quartz observation window; 11. Synchronous radiation source; 12. In-situ imaging instrument; 13. Thermocouple; 14. First hinge; 15. Rocker; 16. Second hinge 2; 17. Crank; 18. Second driving motor; 19. Numerical control system; 20. Second feeding roller 2; 21. Micro thermocouple; 22. Strain gauge; 23. Micro strain gauge; 24. Micro ceramic heater.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION

Detailed contents and specific embodiments of the present disclosure will be further explained with reference to the accompanying drawings.

Figure 1:
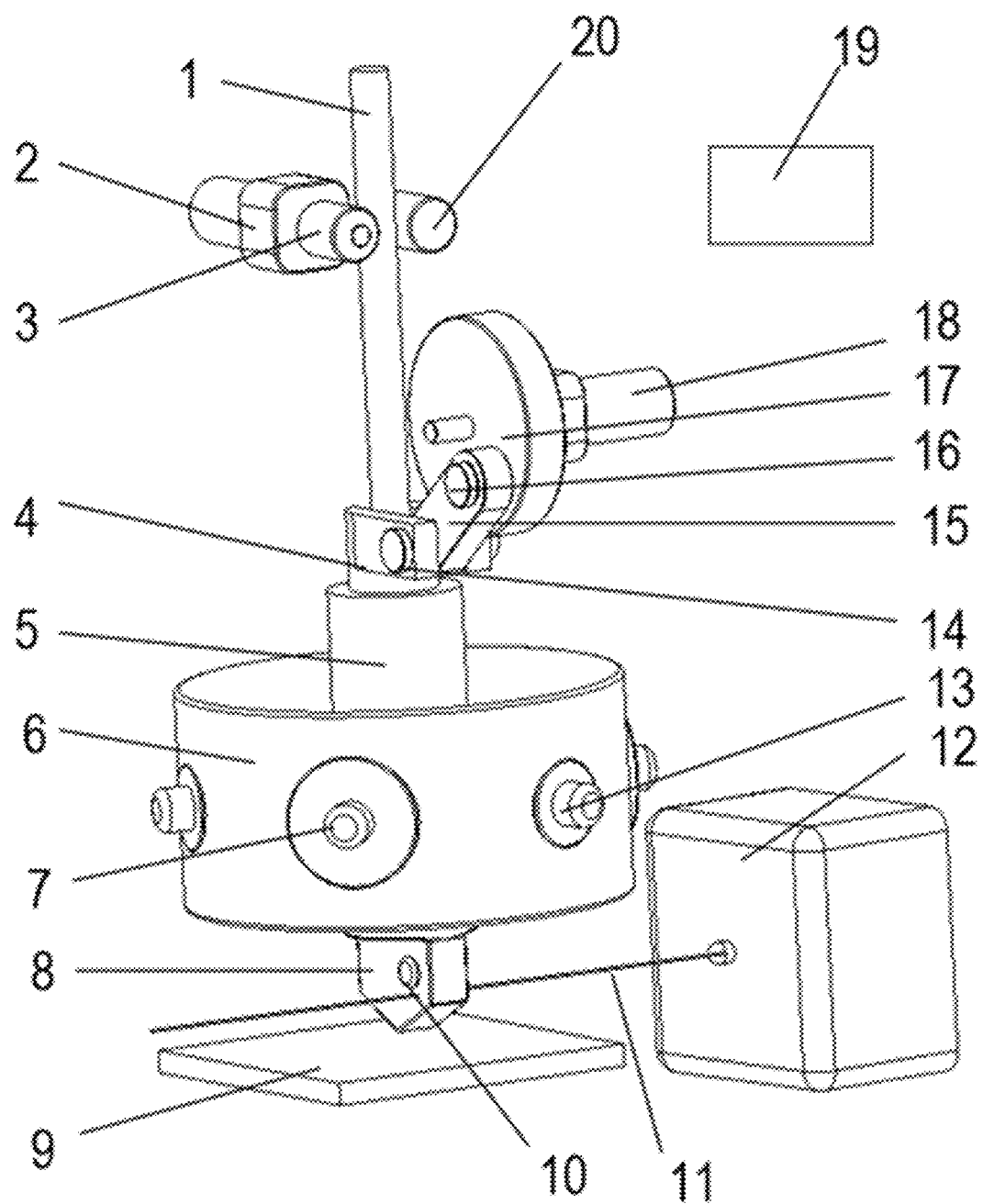
FIG. 1 is a schematic diagram of the overall appearance structure according to the present disclosure.
Figure 2:
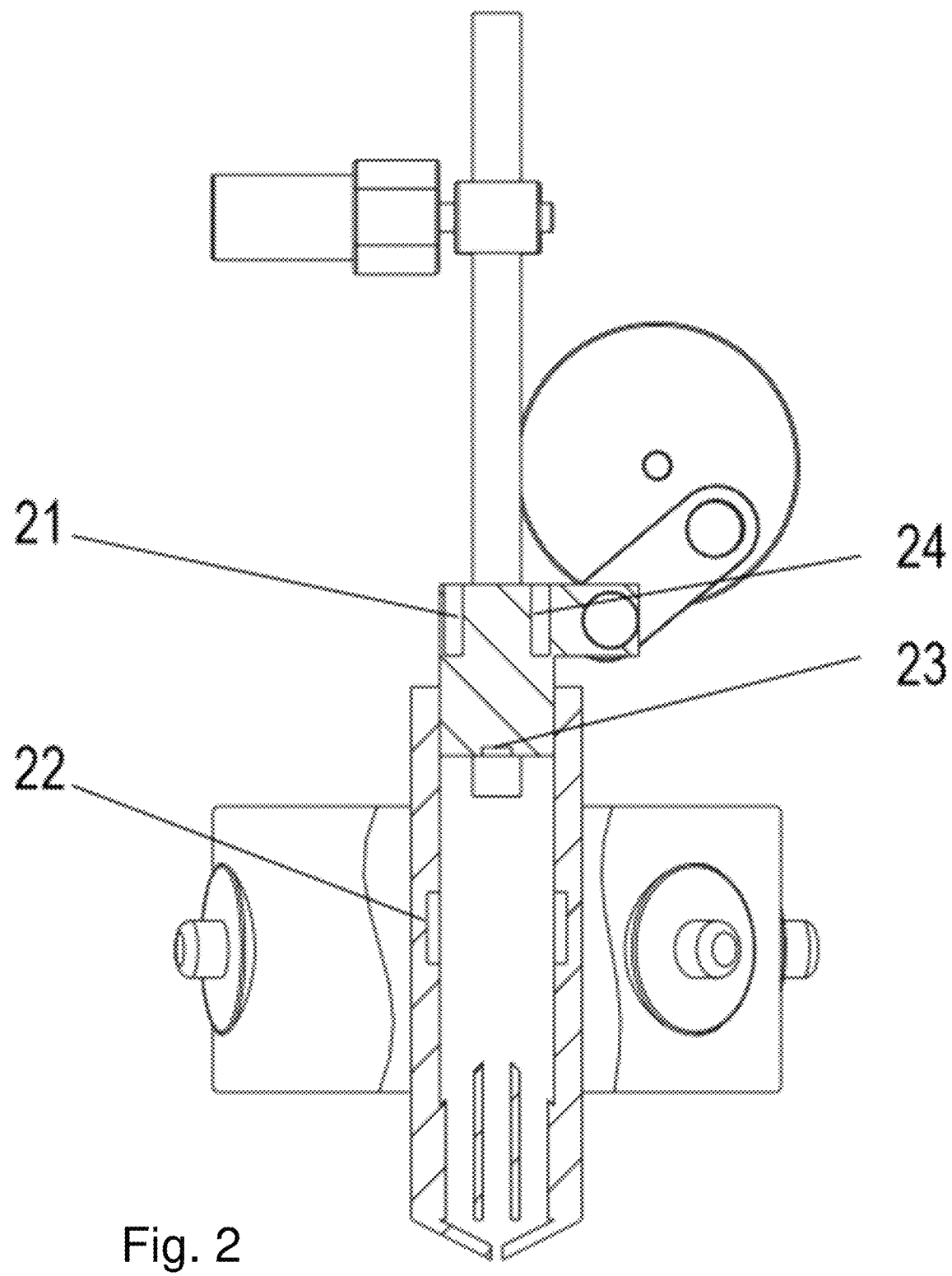
FIG. 2 is a partial cross-sectional diagram of the present disclosure.
Figure 3:
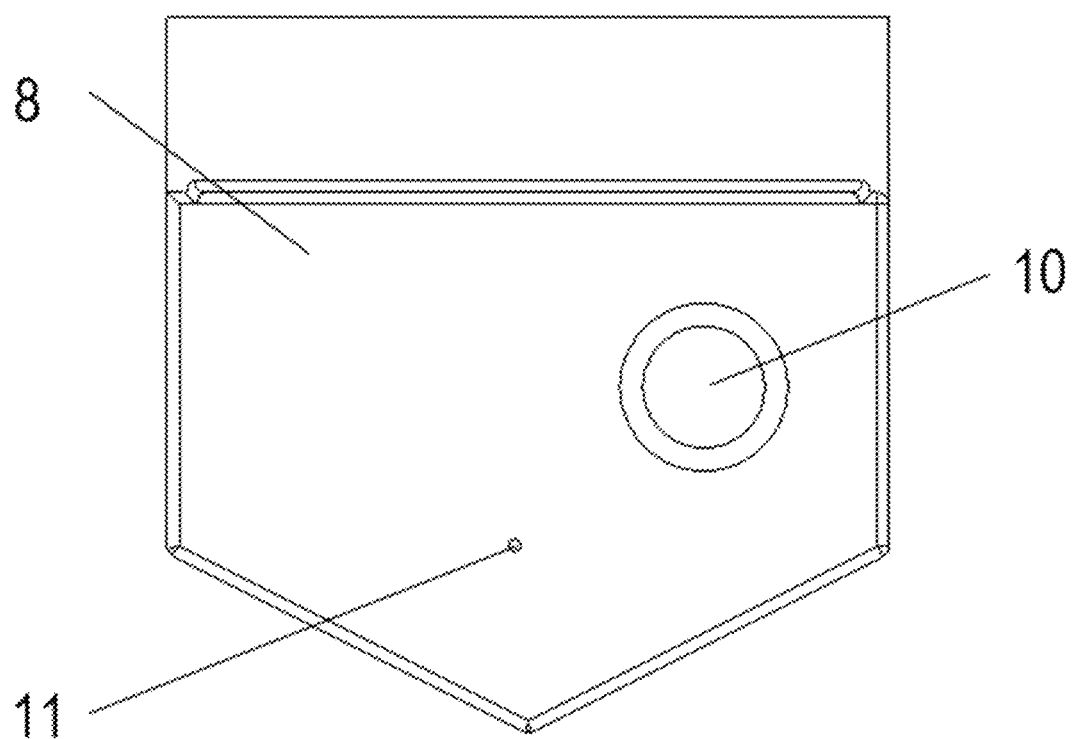
FIG. 3 is an enlarged schematic diagram of a metal nozzle component according to the present disclosure.

As shown in FIG. 1 to FIG. 3, according to the metal additive manufacturing extrusion mechanism for monitoring and improving mechanical properties in situ of the present disclosure, multi-stage high-temperature loading is achieved through silicon nitride heater components distributed in the piston, the outer wall of the cavity and the nozzle, and meanwhile service temperature detection is achieved through thermocouple components. The high temperature loading range is from 0/32 to 300/572 (degrees C./degrees F.) preferably 200/392 (degrees C./degrees F.). The system has an operational temperature range from 0/32 to 1500/2732 (degrees C./degrees F.) preferably 1000/1832 (degrees C./degrees F.). Multi-stage pressurization is achieved through continuous pressure loading of the wire conveying mechanism and high-frequency pressure loading of the piston mechanism and the four-rod mechanism, and then service pressure detection is achieved through strain gauge components on the top of the piston and the inner wall of the cavity. The pressure range for the pressure loading unit is from 1 to 200 ATM preferably 109 ATM or 11 MPa. Through the flat metal head made of thin aluminum plate with internal metal melt shunting, X-ray diffraction (XRD) imaging technology can be used to monitor the formation and growth processes of metal grains in real time. Moreover, the quartz window located at the side branch of the metal nozzle can observe metal surface topography characteristics and changes thereof in real time in combination with an optical microscope. The real-time feedback of in-situ monitoring can provide an effective basis for improvement of the mechanical properties of metal materials in the high temperature forming process.

As shown in FIG. 1 to FIG. 3, the metal additive manufacturing extrusion mechanism for monitoring and improving mechanical properties in situ of the present disclosure comprises a wire conveying unit, a composite cavity unit, a high-temperature loading unit, a temperature detecting unit, a pressure loading unit, a pressure detecting unit and an in-situ monitoring unit, wherein the wire conveying unit consists of a first feeding roller 3, a first driving motor 2 and a second feeding roller 20; the composite cavity unit is rigidly connected with a piston 4 of the pressure loading unit and a heating body 6 of the high-temperature loading unit through its cavity 5, a strain gauge 22 and a nozzle 8, respectively; a ceramic heater 7 in the high-temperature loading unit and a micro ceramic heater 24 are embedded and installed inside the heating body 6 and the piston 4, respectively; a thermocouple 13 in the temperature detecting unit and a micro thermocouple 21 are embedded and installed inside the heating body 6 and the piston 4, respectively; the wire 1 in the pressure loading unit is in interference fit with the inner wall of the piston 4 to form the first-stage pressure loading; the piston 4, a rocker 15 and a crank 17 are connected through a first hinge 14 and a second hinge 16, respectively; a strain gauge 22 in the pressure detecting unit and a micro strain gauge 23 are embedded and installed on the inner wall of the cavity 5 and the top end of the piston 4, respectively; and a substrate 9 is provided with a three-degree-of-freedom movement control system, which moves relative to the metal additive manufacturing extrusion mechanism.

The wire conveying unit comprises a wire 1, a first driving motor 2, a first feeding roller 3 and a second feeding roller 20, wherein the first driving motor 2 provides high-precision and high-stability closed-loop control power for a servo motor. The external surfaces of the first feeding roller 3 and the second feeding roller 20 have texture structures to improve their friction, and the side surface of the second feeding roller 20 is provided with a spring mechanism to enhance their friction;

The composite cavity unit comprises a cavity 5, a heating body 6, a strain gauge 22 and a nozzle 8, wherein the upper end of the inner wall of the cavity 5 is provided with an annular groove structure, which is capable of being closely attached with the piston 4 in the pressure loading unit through an annular sealing gasket to realize sealing protection at the high-temperature loading unit and the pressure loading unit;

The high-temperature loading unit comprises a ceramic heater 7 and a micro ceramic heater 24, wherein the micro ceramic heater 24 is in interference fit with the hole wall of the piston 4 in the pressure loading unit, the ceramic heater 7 is in interference fit with the pores outside the heating body 6, and three groups of ceramic heaters 7 are distributed uniformly in a surrounding manner;

The temperature detecting unit comprises a thermocouple 13 and a micro thermocouple 21, wherein the micro thermocouple 21 is in interference fit with the hole wall of the piston 4 in the pressure loading unit, the thermocouple 13 is in interference fit with the pores outside the heating body 6, and three groups of thermocouples 13 are distributed uniformly in a surrounding manner;

The pressure loading unit comprises a piston 4, a rocker 15, a crank 17, a first hinge 14, a second hinge 16, a second driving motor 18, a wire 1, a first feeding roller 3 and a first driving motor 2, wherein the upper end of the inner wall of the cavity 5 is provided with an annular groove structure, which is capable of being closely attached with the piston 4 in the pressure loading unit through an annular sealing gasket to realize sealing protection at the pressure loading unit; the inner wall of the piston 4 is also provided with an annular groove structure, which is capable of being closely attached with the wire 1 in the pressure loading unit through an annular sealing gasket to realize sealing protection at the pressure loading unit and prevent gas from entering the cavity 5 in the composite cavity unit;

The pressure detecting unit comprises a strain gauge 22 and a micro strain gauge 23, wherein the micro strain gauge 23 is in interference fit with the pores at the top end of the piston 4 in the pressure loading unit, the strain gauge 22 is in interference fit with the pores at the inner wall of the cavity 5, and three groups of strain gauges 22 are distributed uniformly in a surrounding manner;

The in-situ monitoring unit comprises an in-situ imaging instrument 12, a nozzle 8, a quartz observation window 10 and an optical imaging component, wherein the nozzle 8 is made of a thin-walled aluminum plate and is internally shunted, the optical imaging component monitors the surface texture and topography of the measured semi-solid metal in real time through the quartz observation window 10, and the in-situ imaging instrument 12 analyzes the crystal diffraction information and three-dimensional structural characteristics of the measured semi-solid metal by receiving a synchronous radiation light source 11 transmitted through the thin-walled aluminum plate of the nozzle 8.

Three groups of ceramic heaters 7 and thermocouples 13 in the high-temperature loading unit and the temperature detecting unit are uniformly distributed in a surrounding manner to form a second-stage high-temperature loading; The second-stage loading temperature can be from 0/32 to 1500/2732 (degrees C./degrees F.) preferably 1000/1832 (degrees C./degrees F.). The wire 1 is uniformly and fully heated in the cavity 5 due to the uniform distribution in a surrounding manner; and the micro ceramic heater 24 and the micro thermocouple 21 embedded in the piston 4 form the first-stage heating, which plays a preheating role in the process of the wire 1 passing through the piston 4.

The in-situ monitoring unit is capable of simultaneously characterizing the synchronous radiation of the optical surface topography and three-dimensional characteristic structure of the measured semi-solid metal; the optical imaging component observes the optical surface topography of semi-solid metal in real time through the quartz observation window 10 embedded in the side of the nozzle 8, the front objective lens of the optical imaging component has the function of continuously zooming, so that the sunken optical imaging design is used to monitor the topography of the measured semi-solid metal; meanwhile, a thin-walled aluminum plate with a radius of 100 microns (0.00393701 inches) and a thickness of 100 microns (0.00393701 inches) is provided at the center of the nozzle 8, and the synchronous radiation light source is capable of penetrating the center of the thin-walled aluminum plate to the in-situ imaging instrument 12, thereby performing crystal diffraction characterization on the measured semi-solid metal.

The wire 1 in the pressure loading unit and the pressure detecting unit relies on the power of the wire conveying unit consisting of the first driving motor 2, the first feeding roller 3 and the second feeding roller 20 to provide the first-stage pressure loading, wherein the first driving motor 2 is a servo motor, aiming at providing high-precision and high-stability closed-loop control pressure. The crank rocker mechanism consisting of the piston 4, the rocker 15, the crank 17, a first hinge 14, a second hinge 16 and a second driving motor 18 provides the second-stage pressure loading, wherein the second driving motor 18 is a servo motor, which cooperates with the four-rod mechanism to provide high-frequency, high-precision and high-stability closed-loop control pressure for the composite cavity unit; the micro strain gauge 23 is embedded in the top of the piston 4, and three groups of strain gauges 22 are uniformly embedded in the inner wall of the cavity 5 in a surrounding manner, thus providing omnibearing pressure detection for a molten pool system and forming real-time feedback.

The copper material used for the cavity 5 and the heating body 6 has good heat conductivity. The control wires of the first driving motor 2, the ceramic heater 7, the thermocouple 13, the second driving motor 18, the micro ceramic heater 24 and the micro thermocouple 21 are all connected to a numerical control system 19 for integrated control.

With reference to FIG. 1 to FIG. 3, the metal additive manufacturing extrusion mechanism for monitoring and improving mechanical properties in situ of the present disclosure has a main body size of 36 mm (1.41 inches), 23 mm (0.90 inches) and 44 mm (1.73 inches), which is suitable for forming metal products with high mechanical properties. Considering the thin-walled aluminum plate structure at the nozzle 8 and its integrated component of the quartz observation window 10 in the present disclosure, the direct function of the present disclosure is to provide an integrated component of multiple physical field loading and in-situ monitoring for forming metal products with high mechanical properties.

The present disclosure adopts the installation mode from bottom to top and from inside to outside. The substrate 9 is equipped with an independent three-degree-of-freedom motion system, which moves relative to the additive manufacturing extrusion mechanism. The nozzle 8 is rigidly fixed at the bottom of the cavity 5 through threaded connection, and adopts a flat thin-walled aluminum plate structure and is internally shunted, which is beneficial for the in-situ imaging instrument 12 to receive after the synchronous radiation light source 11 penetrates. Synchronous high-resolution characterization of the internal three-dimensional structure of the measured semi-solid metal can be realized. The quartz observation window 10 integrated at the nozzle 8 can be matched with an optical imaging instrument, which can realize synchronous high-resolution characterization of the surface topography of the measured semi-solid metal. Three groups of strain gauges 22 are uniformly embedded in the inner wall of the cavity 5 in a surrounding manner, which provides omnibearing pressure detection for the molten pool system and forms real-time feedback. The whole heating body 6 is welded outside the cavity 5 and is rigidly fixed on the base. The three groups of ceramic heaters 7 and thermocouples 13 are uniformly distributed in a surrounding manner. The wire 1 is uniformly and fully heated in the cavity 5 due to the uniform distribution in a surrounding manner. The piston 4, the cavity 5 and the wire 1 are in interference fit with each other. The crank rocker mechanism consisting of the piston 4, the rocker 15, the crank 17, a first hinge 14, a second hinge 16 and a second driving motor 18 provides the second-stage pressure loading, wherein the driving motor is a servo motor, which cooperates with the four-rod mechanism to provide high-frequency, high-precision and high-stability closed-loop control pressure for the composite cavity unit. The micro strain gauge 23 is embedded in the top of the piston 4 to detect the first-stage pressure loading in real time and form feedback. The micro ceramic heater 24 and the micro thermocouple 21 embedded in the piston 4 form the first-stage heating, which plays a preheating role in the process of the wire 1 passing through the piston 4. The second driving motor 18 and the first driving motor 2 are rigidly fixed on the base. The wire 1 relies on the power of the wire conveying unit consisting of the first driving motor 2, the first feeding roller 3 and the second feeding roller 20 to provide the first-stage pressure loading, wherein the driving motor is a servo motor, aiming at providing high-precision and high-stability closed-loop control pressure.

The above is only a preferred example of the present disclosure, and is not used to limit the present disclosure. For those skilled in the art, the present disclosure can be modified and varied variously. Any modification, equivalent substitution, improvement, etc. made to the present disclosure shall be included in the protection scope of the present disclosure.

Since many modifications, variations, and changes in detail can be made to the described embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

In addition, the present invention has been described with reference to embodiments, it should be noted and understood that various modifications and variations can be crafted by those skilled in the art without departing from the scope and spirit of the invention. Accordingly, the foregoing disclosure should be interpreted as illustrative only and is not to be interpreted in a limiting sense. Further it is intended that any other embodiments of the present invention that result from any changes in application or method of use or operation, method of manufacture, shape, size, or materials which are not specified within the detailed written description or illustrations contained herein are considered within the scope of the present invention.

Insofar as the description above and the accompanying drawings disclose any additional subject matter that is not within the scope of the claims below, the inventions are not dedicated to the public and the right to file one or more applications to claim such additional inventions is reserved.

Although very narrow claims are presented herein, it should be recognized the scope of this invention is much broader than presented by the claim. It is intended that broader claims will be submitted in an application that claims the benefit of priority from this application.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A metal additive manufacturing extrusion mechanism for monitoring and improving mechanical properties in situ, comprising a wire conveying unit, composite cavity unit, a high-temperature loading unit, a temperature detecting unit, a pressure loading unit, a pressure detecting unit and an in-situ monitoring unit, wherein the composite cavity unit comprises a cavity (5) and a nozzle (8); and is rigidly connected with a piston (4) of the pressure loading unit and a heating body (6) of the high-temperature loading unit through the cavity (5), at least one strain gauge (22) of the pressure detection unit, and the nozzle (8), respectively;

the high-temperature loading unit comprises the heating body (6), at least one ceramic heater (7) and a micro ceramic heater (24) which are embedded and installed inside the heating body (6) and the piston (4), respectively;

the temperature detecting unit comprises at least one thermocouple (13) and a micro thermocouple (21), which are embedded and installed inside the heating body (6) and the piston (4), respectively;

the pressure loading unit comprises the piston (4), a rocker (15), and a crank (17); a wire (1) of the wire conveying unit extends to the pressure loading unit and is in interference fit with an inner wall of the piston (4) to form a first-stage pressure loading; the piston (4), the rocker (15) and the crank (17) are connected through a first hinge (14) and a second hinge (16), respectively;

the pressure detecting unit comprises the at least one strain gauge (22) and a micro strain gauge (23), which are embedded and installed on an inner wall of the cavity (5) and a top end of the piston (4) respectively; and a substrate (9) is provided with a three-degree-of-freedom movement control system, which moves relative to the metal additive manufacturing extrusion mechanism.

2. The metal additive manufacturing extrusion mechanism for monitoring and improving mechanical properties in situ according to claim 1, wherein the wire conveying unit comprises the wire (1), a first driving motor (2), a first feeding roller (3) and a second feeding roller (20), wherein the first driving motor (2) provides power for a servo motor; the external surfaces of the first feeding roller (3) and the second feeding roller (20) have texture structures, and the side surface of the second feeding roller (20) is provided with a spring mechanism;

an upper end of the inner wall of the cavity (5) of the composite cavity unit is provided with an annular groove structure, which is capable of being closely attached with the piston (4) in the pressure loading unit through an annular sealing gasket to realize sealing protection at the high-temperature loading unit and the pressure loading unit;

the micro ceramic heater (24) of the high-temperature loading unit is in interference fit with a hole wall of the piston (4) in the pressure loading unit, the at least one ceramic heater (7) is in interference fit with pores outside the heating body (6) of the high-temperature loading unit, and the at least one ceramic heater (7) is distributed uniformly in a surrounding manner;

the micro thermocouple (21) of the temperature detecting unit is in interference fit with the hole wall of the piston (4) in the pressure loading unit, the at least one thermocouple (13) of the temperature detecting unit is in interference fit with the pores outside the heating body (6), and the at least one thermocouple is (13) distributed uniformly in a surrounding manner;

the pressure loading unit further comprises a first hinge (14), a second hinge (16), and a second driving motor (18), the inner wall of the piston (4) is provided with an annular groove structure, which is capable of being closely attached with the wire (1) in the wire conveying unit through an annular sealing gasket to realize sealing protection at the pressure loading unit and prevent gas from entering the cavity (5) in the composite cavity unit;

the micro strain gauge (23) is in interference fit with the pores at the top end of the piston (4) in the pressure loading unit, the at least one strain gauge (22) is in interference fit with the pores at the inner wall of the cavity (5), and the at least one of strain gauge (22) is distributed uniformly in a surrounding manner; and the in-situ monitoring unit comprises an in-situ imaging instrument (12), the nozzle (8), a quartz observation window (10) and an optical imaging component, wherein the nozzle (8) is made of a thin-walled aluminum plate and is internally shunted, and the optical imaging component monitors the surface texture and topography of the measured semi-solid metal in real time through the quartz observation window (10).

3. The metal additive manufacturing extrusion mechanism for monitoring and improving mechanical properties in situ according to claim 1, wherein the micro ceramic heater (24) and the micro thermocouple (21) form a first-stage heating, which plays a preheating role in the process of the wire (1) passing through the piston (4); and the at least one ceramic heater (7) and the at least one thermocouple (13) uniformly distributed in a surrounding manner form a second-stage heating to uniformly and fully heat the wire (1) extended in the cavity (5).

4. The metal additive manufacturing extrusion mechanism for monitoring and improving mechanical properties in situ according to claim 2, wherein the in-situ monitoring unit is capable of simultaneously characterizing the synchronous radiation of the optical surface topography and three-dimensional characteristic structure of the measured semi-solid metal; the optical imaging component observes the optical surface topography of semi-solid metal in real time through the quartz observation window (10) embedded in the side of the nozzle (8), a front objective lens of the optical imaging component has the function of continuously zooming, so that the sunken optical imaging design is used to monitor the topography of the measured semi-solid metal; meanwhile, a thin-walled aluminum plate with a radius of 100 microns and a thickness of 100 microns is provided at the center of the nozzle (8), and the synchronous radiation light source is capable of penetrating the center of the thin-walled aluminum plate to the in-situ imaging instrument (12), thereby performing crystal diffraction characterization on the measured semi-solid metal.

5. The metal additive manufacturing extrusion mechanism for monitoring and improving mechanical properties in situ according to claim 1, wherein the wire (1) in the pressure loading unit and the pressure detecting unit relies on the power of the wire conveying unit consisting of the first driving motor (2), the first feeding roller (3) and the second feeding roller (20) to provide the first-stage pressure loading, and the crank rocker mechanism consisting of the piston (4), the rocker (15), the crank (17), a first hinge (14), a second hinge (16) and a second driving motor (18) provides the second-stage pressure loading, wherein the second driving motor (18) is a servo motor, which cooperates with a four-rod mechanism to provide high-frequency, high-precision and high-stability closed-loop control pressure for the composite cavity unit; the micro strain gauge (23) is embedded in the top of the piston (4), and the at least one strain gauge (22) is uniformly embedded in the inner wall of the cavity (5) in a surrounding manner, thus providing omnibearing pressure detection for a molten pool system and forming real-time feedback.

6. The metal additive manufacturing extrusion mechanism for monitoring and improving mechanical properties in situ according to claim 1, wherein the cavity (5) and the heating body (6) are made of copper materials; the control wires of the first driving motor (2), the ceramic heater (7), the thermocouple (13), the second driving motor (18), the micro ceramic heater (24) and the micro thermocouple (21) are all connected to a numerical control system (19) for integrated control.

* * * * *